(12) United States Patent
Chandrabose et al.

(10) Patent No.: US 7,748,210 B2
(45) Date of Patent: Jul. 6, 2010

(54) SYSTEM AND METHOD FOR USE IN A COMBINED OR RANKINE CYCLE POWER PLANT

(75) Inventors: Shinoj Vakkayil Chandrabose, Thrissur Kerala (IN); Diego Fernando Rancruel, Greenville, SC (US); Prakash Narayan Govindan, Chennia (IN); Anil Kumar Sharma, Rewa (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/183,413

(22) Filed: Jul. 31, 2008

(65) Prior Publication Data

US 2010/0024383 A1 Feb. 4, 2010

(51) Int. Cl.
*F02C 6/00* (2006.01)

(52) U.S. Cl. .................. 60/39.181; 60/39.3; 60/685; 62/115

(58) Field of Classification Search ............ 60/39.181, 60/39.3, 775, 793, 685, 693; 62/115, 238.3
See application file for complete search history.

(56) References Cited

U.S. PATENT DOCUMENTS

| | | | |
|---|---|---|---|
| 3,423,078 A | 1/1969 | May | |
| 3,831,667 A | 8/1974 | Kilgore et al. | |
| 4,223,529 A * | 9/1980 | Willyoung | 60/39.181 |
| 4,353,217 A * | 10/1982 | Nishioka et al. | 60/693 |
| 4,379,485 A | 4/1983 | Fisher, Jr. et al. | |
| 4,520,634 A * | 6/1985 | Oouchi et al. | 62/476 |
| 4,655,975 A * | 4/1987 | Snoble | 562/41 |
| 5,555,738 A | 9/1996 | DeVault | |
| 5,675,970 A * | 10/1997 | Yamada et al. | 60/670 |
| 5,787,970 A | 8/1998 | Larinoff | |
| 6,058,695 A | 5/2000 | Ranasinghe et al. | |
| 6,170,263 B1 | 1/2001 | Chow et al. | |
| 7,178,348 B2 | 2/2007 | Stuhlmueller | |
| 2006/0123767 A1 | 6/2006 | Briesch | |
| 2007/0006565 A1 * | 1/2007 | Fleischer et al. | 60/39.5 |

* cited by examiner

*Primary Examiner*—Michael Cuff
*Assistant Examiner*—Phutthiwat Wongwian
(74) *Attorney, Agent, or Firm*—Cantor Colburn LLP

(57) ABSTRACT

A system is provided and includes a first condenser configured to fluidly receive a first steam supply and tower water and to output a first water supply, a second condenser configured to fluidly receive a first portion of a second steam supply and the first water supply and to output a second water supply, and a vapor-absorption-machine (VAM) configured to fluidly receive a second portion of the second steam supply and the second water supply by which a refrigeration cycle is conducted to thereby cool at least one of the tower water and a third water supply used to cool the tower water.

16 Claims, 2 Drawing Sheets

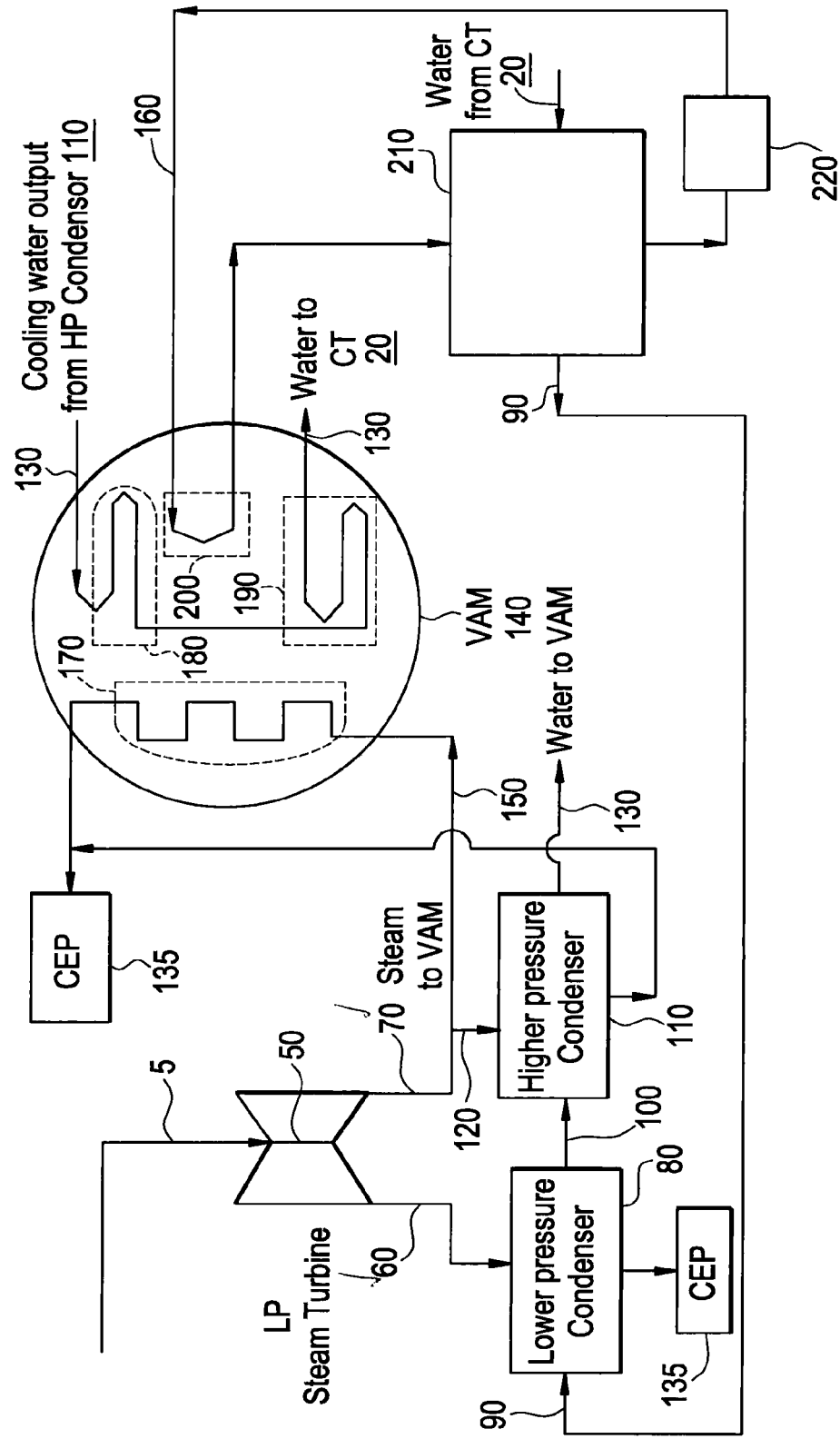

SYSTEM AND METHOD FOR USE IN A COMBINED OR RANKINE CYCLE POWER PLANT

BACKGROUND OF THE INVENTION

1. Field of the Invention

Figure 1:
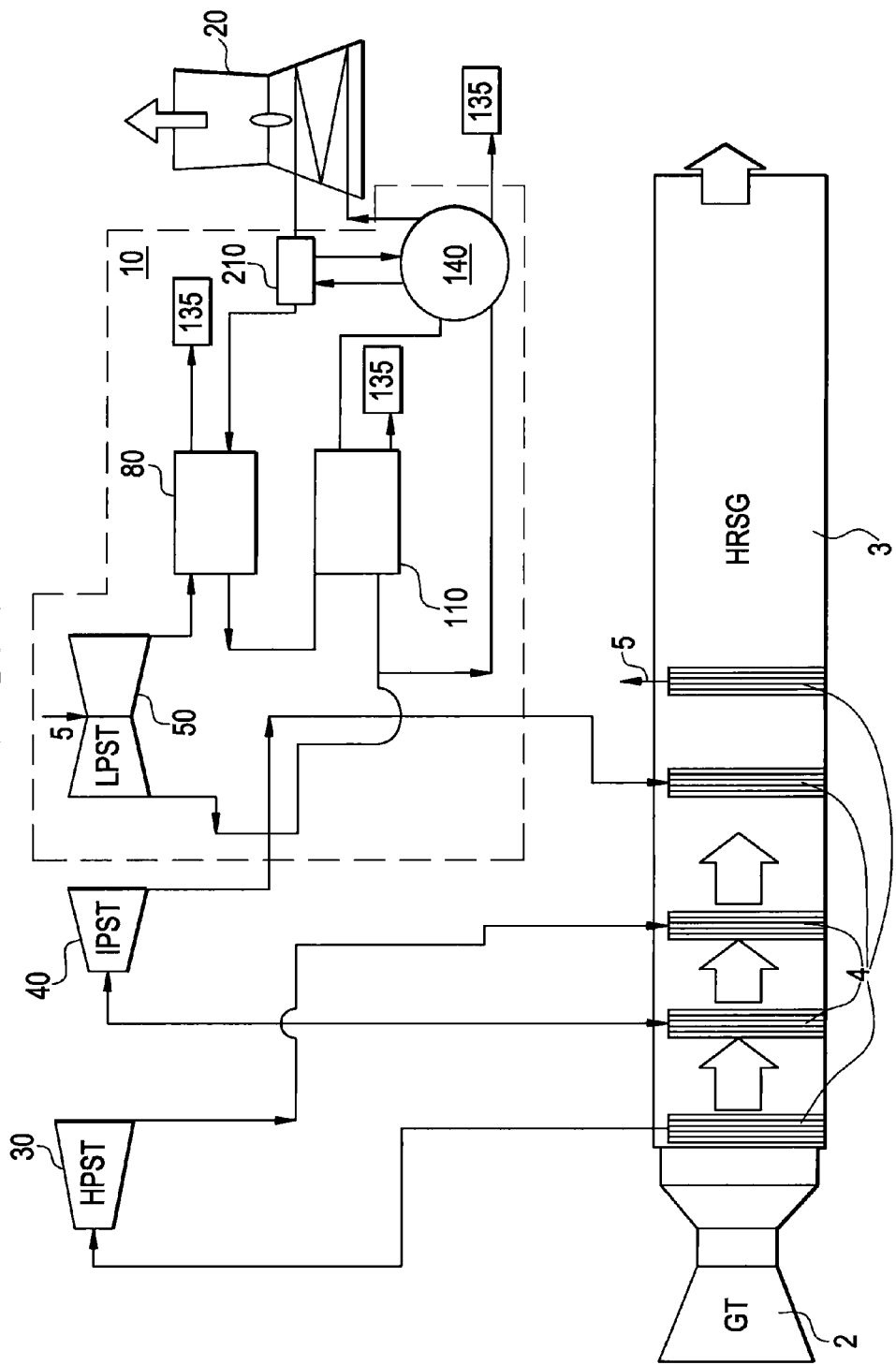

Aspects of the present invention are directed to a system and a method for use in a power plant and, more particularly, to a system and a method for use in a combined or rankine cycle power plant.

2. Description of the Background

In combined cycle power plants, it has been seen that about 30% of the generated energy is wasted in condensers of the power plants because of the thermodynamic requirement to reject heat.

This problem has been addressed in some cases by employing a vapor absorption system that is used to recover the heat rejected in the condenser to produce a refrigeration effect. This refrigeration effect has been used to chill the inlet air to the gas turbine in a gas turbine and steam turbine combined cycle installation. In other cases, this problem has been addressed by employing a Kalina bottoming cycle in a combined cycle power plant.

SUMMARY OF THE INVENTION

In accordance with an aspect of the invention, a system for use in a rankine cycle power plant, including a cooling tower and, at least, a low pressure steam turbine configured to output first and second steam supplies at first and second respective pressures, is provided and includes a first condenser configured to fluidly receive the first steam supply and tower water and to output a first water supply, a second condenser configured to fluidly receive a first portion of the second steam supply and the first water supply and to output a second water supply, and a vapor-absorption-machine (VAM) configured to fluidly receive a second portion of the second steam supply and the second water supply by which a refrigeration cycle is conducted to thereby cool at least one of the tower water and a third water supply used to cool the tower water.

In accordance with another aspect of the invention, a system for use with a rankine cycle power plant, is provided in which the power plant includes a gas turbine which generates heat during operations thereof, a steam source, coupled to the gas turbine, which generates steam from the heat generated by the gas turbine, at least high and low pressure steam turbines, each of which is configured to fluidly receive the generated steam, the low pressure steam turbine being further configured to output first and second steam supplies at first and second respective pressures, and a cooling tower, and the system includes a first condenser configured to fluidly receive the first steam supply and tower water and to output a first water supply, a second condenser configured to fluidly receive a first portion of the second steam supply and the first water supply and to output a second water supply, and a vapor-absorption-machine (VAM) configured to fluidly receive a second portion of the second steam supply and the second water supply by which a refrigeration cycle is conducted to thereby cool at least one of the tower water and a third water supply used to cool the tower water.

In accordance with another aspect of the invention, a method for use in a rankine cycle power plant, including a cooling tower and, at least, a low pressure steam turbine configured to output first and second steam supplies at first and second respective pressures, is provided and includes operating a low pressure condenser with respect to the first steam supply and tower water to thereby output the tower water as having been heated and as a first water supply, operating a high pressure condenser with respect to a first portion of the second steam supply and the first water supply to thereby output the first water supply as having been further heated and as a second water supply; and cooling the tower water with a refrigerant acted upon by a second portion of the second steam supple and the second water supply, or cooling a third water supply with the refrigerant acted upon by the second portion of the second steam supply and the second water supply and cooling the tower water with the cooled third water supply.

BRIEF DESCRIPTIONS OF THE DRAWINGS

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is schematic illustration of an exemplary combined cycle power plant; and FIG. 2 is a schematic illustration of a portion of the combined cycle power plant of FIG. 1.

DETAILED DESCRIPTION OF THE INVENTION

With reference to FIG. 1, a system 10 for use in, e.g., a combined cycle power plant or, alternately, a rankine cycle power plant, is provided. The exemplary combined or rankine cycle power plant may include a gas turbine 2, which generates heat during operations thereof, a heat recovery steam generator (HRSG) 3, which is coupled to the gas turbine 2, a cooling tower 20, a high pressure steam turbine (HPST) 30, an intermediate pressure steam turbine (IPST) 40 and a low pressure steam turbine (LPST) 50. The HRSG 3 generates steam by way of the heat generated by the gas turbine 2 and includes heat exchangers 4, such as super heaters, evaporators, and pre-heaters, which are disposed along an axis thereof, and by which portions of the generated steam are diverted to the HPST 30, the IPST 40 and the LPST 50. The HPST 30, the IPST 40 and the LPST 50 generate power, such as electricity, by way of the diverted steam, and output spent steam supplies. An operation of the system 10 relates to a use of the spent steam supplies of at least the LPST 50.

Here, it is noted that the combined or rankine cycle power plant shown in FIG. 1 is merely exemplary and that other configurations of the same are possible. For example, the HPST 30, the IPST 40 and the LPST 50 may be interchangeable or removed entirely as long as the system 10 is provided with a supply of diverted steam. Moreover, it is understood that the system 10 could be applied for use in other types of power plants and in other industrial applications besides those which are discussed herein. As a further example, the HPST 30, the IPST 40 and the LPST 50 may be coupled to the gas turbine 2 or may be run independently via a direct combustion of fuel, which generates heat from which steam may also be generated.

With reference to FIG. 2, the LPST 50 receives inlet steam supply 5 from the HRSG 3 or, in other arrangements, any one or more of the HRSG 3, the HPST 30 or the IPST 40, and generates power and/or electricity during operations thereof Spent steam is outputted from relatively low and high stages of the LPST 50 as, at least, a first steam supply 60 and a second steam supply 70, where the first steam supply 60 will generally have a lower pressure than the second steam supply 70. For example, in one particular embodiment, the first steam supply 60 may have a pressure of about 0.5 psia and the second steam supply may have a pressure of about 1 psia.

A first condenser 80, such as a low pressure condenser, is fluidly coupled to the first steam supply 60 and a supply of tower water 90 provided from the cooling tower 20. As such, the first condenser 80 is configured to fluidly receive the first steam supply 60 and the tower water 90, to operate with respect to the tower water 90 via the first steam supply and to output a first water supply 100 and a condensed steam supply. Similarly, a second condenser 110, such as a high pressure condenser, is fluidly coupled to the first water supply 100 and to a first portion of the second steam supply 120. As such, the second condenser is configured to fluidly receive the first portion of the second steam supply 120 and the first water supply 100, to operate with respect to the first water supply 100 via the first portion of the second steam supply 120 and to output a second water supply 130 and yet another condensed steam supply. The condensed steam supplies output from the first and second condensers 80 and 110 may be diverted to a condensate extraction pump (CEP) 135.

A vapor-absorption-machine (VAM) 140 is configured to fluidly receive a second portion of the second steam supply 150, which may have a pressure of about 1 psia, the second water supply 130 and either the tower water 90 or a third water supply 160. A refrigeration cycle is conducted therein by way of the second portion of the second steam supply 150 and the second water supply 130 to cool the tower water 90 or third water supply 160. Where the third water supply 160 is cooled in the VAM 140, the cooled third water supply 160 is subsequently used to cool the tower water 90. The VAM 140 includes a supply of refrigerant, such as Ammonia/water or Lithium Bromide/water combinations, which is cycled through the refrigeration cycle.

In one arrangement, the VAM 140 includes a first heat exchanger 170 by which the second portion of the second steam supply 150 heats and thereby activates the refrigerant, a second heat exchanger 180 by which the second water supply 130 cools the activated refrigerant, a third heat exchanger 190 by which the second water supply 130 condenses the cooled refrigerant, and a fourth heat exchanger 200 by which the condensed refrigerant cools the tower water 90 or the third water supply 160. Here, the second and third heat exchangers 180 and 190 are arranged fluidly in series with one another on the water side of the VAM 140.

Once the second portion of the second steam supply 150 is employed to heat and activate the refrigerant, the second portion of the second steam supply may be outputted from the VAM 140 and subsequently diverted to the CEP 135. Conversely, once the second water supply 130 is employed to cool and condense the activated refrigerant, the second water supply 130 is outputted from the VAM 140 and subsequently diverted to the cooling tower 20. The second water supply 130 is then cooled in the cooling tower 20 and by the third water supply 160. Thereafter, the second water supply 160 provides for the supply of the tower water 90.

The cooling of the second water supply 130 by the third water supply 160 is provided for by a tower water heat exchanger 210 and a pumping system 220. The pumping system 220 is configured to recycle the third water supply 160 through the tower water heat exchanger 210 and the VAM 140. Here, the tower water heat exchanger 210 may include various types of heat exchangers, such as, but not limited to, a plate-type heat exchanger. The degree of water cooling at the tower water heat exchanger may be about 20 degrees Fahrenheit.

In accordance with another aspect, a method for use in a combined or rankine cycle power plant, including a cooling tower 20 and, at least, a low pressure steam turbine 50 configured to output first and second steam supplies 60 and 70 at first and second respective pressures, is provided and includes operating a low pressure condenser 80 with respect to the first steam supply and tower water to thereby output the tower water as having been heated and as a first water supply 100, operating a high pressure condenser 110 with respect to a first portion of the second steam supply 120 and the first water supply 100 to thereby output the first water supply as having been further heated and as a second water supply 130, cooling a third water supply 160 with a refrigerant acted upon by a second portion of the second steam supply 150 and the second water supply 130, and cooling the tower water 90 with the cooled third water supply 160.

The method may further include diverting condensed supplies of steam, which are outputted from the operation of the low and high pressure condensers, to a condensate extraction pump (CEP) 135, and diverting the second water supply 130 to the cooling tower 20 following the acting of the second water supply 130 upon the refrigerant.

In addition, the method may further include conducting a series of heat exchanges between the second portion of the second steam supply 150 and the refrigerant and the second water supply 130 and the refrigerant, conducting a heat exchange between the refrigerant and the third water supply 160, and conducting a heat exchange between the third water supply 160 and the tower water 90.

It has been seen that a combined or rankine cycle power plant that employs system 10 may see an approximately 2.8 MW increase in steam turbine wheel output, an approximately 2.4 MW drop in total auxiliary load and, concurrently, an approximately 5.25 MW increase in net output power. In addition, the combined or rankine cycle power plant may see about a 0.25% rise in operational efficiency which will, over time, recoup installation costs.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A system for use in a ranikine cycle power plant, including a cooling tower and, at least, a low pressure steam turbine configured to output first and second steam supplies at first and second respective pressures, comprising:
   a first condenser configured to fluidly receive the first steam supply and tower water and to output a first water supply;
   a second condenser configured to fluidly receive a first portion of the second steam supply and the first water supply and to output a second water supply; and
   a vapor-absorption-machine (VAM) configured to fluidly receive a second portion of the second steam supply and the second water supply by which a refrigeration cycle is conducted to thereby cool at least one of the tower water and a third water supply used to cool the tower water.

2. The system according to claim 1, wherein the first pressure of the first steam supply is lower than the second pressure of the second steam supply.

3. The system according to claim 1, wherein additional steam supplies outputted from the first and second condensers are diverted to a condensate extraction pump (CEP).

4. The system according to claim 1, wherein the VAM comprises:
   a first heat exchanger by which the second portion of the second steam supply heats and thereby activates a refrigerant;
   a second heat exchanger by which the second water supply cools the activated refrigerant;
   a third heat exchanger by which the second water supply condenses the cooled refrigerant; and
   a fourth heat exchanger by which the condensed refrigerant cools the third water supply and is thereby vaporized.

5. The system according to claim 4, wherein the second portion of the second steam supply is condensed in the VAM and diverted to a condensate extraction pump (CEP).

6. The system according to claim 4, wherein the second water supply is outputted from the VAM and diverted to the cooling tower.

7. The system according to claim 1, further comprising:
   a tower water heat exchanger by which the third water supply cools the tower water; and
   a pumping system to recycle the third water supply through the tower water heat exchanger and the VAM.

8. The system according to claim 7, wherein the tower water heat exchanger comprises a plate-type heat exchanger.

9. A system for use with a rankine cycle power plant, the power plant comprising:
   a gas turbine which generates heat during operations thereof
   a steam source, coupled to the gas turbine, which generates steam from the heat generated by the gas turbine;
   at least high and low pressure steam turbines, each of which is configured to fluidly receive the generated steam, the low pressure steam turbine being further configured to output first and second steam supplies at first and second respective pressures; and
   a cooling tower, the system comprising:
   a first condenser configured to fluidly receive the first steam supply and tower water and to output a first water supply;
   a second condenser configured to fluidly receive a first portion of the second steam supply and the first water supply and to output a second water supply; and
   a vapor-absorption-machine (VAM) configured to fluidly receive a second portion of the second steam supply and the second water supply by which a refrigeration cycle is conducted to thereby cool at least one of the tower water and a third water supply used to cool the tower water.

10. The system according to claim 9, wherein the first pressure of the first steam supply is lower than the second pressure of the second steam supply.

11. The system according to claim 9, wherein the condensed steam supplies outputted from the first and second condensers are diverted to a condensate extraction pump.

12. The system according to claim 9, wherein the VAM comprises:
   a first heat exchanger by which the second portion of the second steam supply heats and thereby activates a refrigerant;
   a second heat exchanger by which the second water supply cools the activated refrigerant;
   a third heat exchanger by which the second water supply condenses the cooled refrigerant; and
   a fourth heat exchanger by which the condensed refrigerant cools the third water supply and is thereby vaporized.

13. The system according to claim 12, wherein the second portion of the second steam supply is condensed in the VAM and diverted to a condensate extraction pump (CEP).

14. The system according to claim 12, wherein the second water supply is outputted from the VAM and diverted to the cooling tower.

15. The system according to claim 9, further comprising:
   a tower water heat exchanger by which the third water supply cools the tower water; and
   a pumping system to recycle the third water supply through the tower water heat exchanger and the VAM.

16. The system according to claim 15, wherein the tower water heat exchanger comprises a plate-type heat exchanger.

* * * * *